United States Patent
Bian et al.

(10) Patent No.: US 10,348,689 B2
(45) Date of Patent: *Jul. 9, 2019

(54) INTERCONNECTING EXTERNAL NETWORKS WITH OVERLAY NETWORKS IN A SHARED COMPUTING ENVIRONMENT

(71) Applicant: International Business Machines Corporation, Armonk, NY (US)

(72) Inventors: Guo Chun Bian, Shanghai (CN); Jin Jing Lin, Wuxi (CN); Liang Rong, Shanghai (CN); Gang Tang, Wuxi (CN); Ming Shuang Xian, Wuxi (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/823,099

(22) Filed: Nov. 27, 2017

(65) Prior Publication Data
US 2018/0083923 A1 Mar. 22, 2018

Related U.S. Application Data

(63) Continuation of application No. 14/850,460, filed on Sep. 10, 2015, now Pat. No. 9,860,214.

(51) Int. Cl.
*H04L 29/06* (2006.01)
*H04L 29/08* (2006.01)

(52) U.S. Cl.
CPC .......... *H04L 63/0272* (2013.01); *H04L 63/20* (2013.01); *H04L 67/141* (2013.01)

(58) Field of Classification Search
CPC .... H04L 63/0272; H04L 63/20; H04L 67/141
See application file for complete search history.

(56) References Cited

U.S. PATENT DOCUMENTS

| 8,345,692 B2 | 1/2013 | Smith |
| 8,464,335 B1 * | 6/2013 | Sinha ................. G06F 21/51 713/153 |

(Continued)

FOREIGN PATENT DOCUMENTS

WO  WO 2011/056714  5/2011

OTHER PUBLICATIONS

List of IBM Patents or Patent Applications Treated as Related, Jan. 11, 2018, 2 pages.

(Continued)

*Primary Examiner* — Hosuk Song
*Assistant Examiner* — J. Brant Murphy
(74) *Attorney, Agent, or Firm* — Heslin Rothenberg Farley & Mesiti P.C.; Isaac Gooshaw, Esq.

(57) ABSTRACT

A method includes obtaining, by one or more processor, data from a virtual network of a tenant and an identifier of the tenant, where the virtual network of the tenant is one of at least two virtual networks in a shared computing environment where the at least two virtual networks overlay a physical network. Based on obtaining the identifier of the tenant, the method includes setting, by one or more processor, the identifier in metadata of the data and based on the identifier in the metadata, identifying, by the one or more processor, a network connection associated with the tenant. The method also includes identifying, by the one or more processor, a policy of the network connection and processing the data with the policy to create processed data and transmitting, by the one or more processor, the processed data through the network connection.

16 Claims, 9 Drawing Sheets

(56) References Cited

U.S. PATENT DOCUMENTS

| | | | |
|---|---|---|---|
| 9,860,214 B2 | 1/2018 | Bian et al. | |
| 2005/0129019 A1* | 6/2005 | Cheriton | H04L 63/0272 370/392 |
| 2007/0248085 A1* | 10/2007 | Volpano | H04L 12/4679 370/389 |
| 2008/0244184 A1* | 10/2008 | Lewis | G06F 16/24552 711/130 |
| 2011/0213869 A1* | 9/2011 | Korsunsky | G06F 21/55 709/223 |
| 2011/0214157 A1* | 9/2011 | Korsunsky | G06F 21/55 726/1 |
| 2011/0261828 A1* | 10/2011 | Smith | H04L 12/462 370/401 |
| 2013/0091261 A1* | 4/2013 | Barabash | H04L 41/5096 709/223 |
| 2013/0136133 A1* | 5/2013 | Alkhatib | H04L 29/12047 370/392 |
| 2013/0329605 A1* | 12/2013 | Nakil | H04L 41/0668 370/255 |
| 2014/0068703 A1* | 3/2014 | Balus | H04L 41/0893 726/1 |
| 2014/0086253 A1* | 3/2014 | Yong | H04L 12/4633 370/395.53 |
| 2014/0115325 A1* | 4/2014 | Detienne | H04L 63/0209 713/160 |
| 2014/0307744 A1* | 10/2014 | Dunbar | H04L 45/44 370/401 |
| 2015/0081863 A1* | 3/2015 | Garg | H04L 41/00 709/223 |
| 2015/0163158 A1* | 6/2015 | Ryland | H04L 47/70 709/225 |
| 2015/0195178 A1* | 7/2015 | Bhattacharya | H04L 45/745 718/1 |

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.

T. Narten, Ed., Problem Statement: Overlays for Network Virtualization, Oct. 2014, ISSN: 2070-1721.

* cited by examiner

INTERCONNECTING EXTERNAL NETWORKS WITH OVERLAY NETWORKS IN A SHARED COMPUTING ENVIRONMENT

TECHNICAL FIELD

One or more aspects of the present invention relates to utilizing a virtual private network (VPN) gateway to interconnect external networks of different tenants in a shared environment, such as a data center, with an overlay network.

BACKGROUND

The use of overlay networks, also called virtual networks, is gaining popularity in data centers and other multiple tenant data storage environments for its ability to decouple physical and virtual networks and allow one physical network infrastructure to provide virtual networks for multiple tenants. In an overlay network, the separation of tenants is hidden from the underlying physical infrastructure. Thus, the underlying transport network does not need to know about tenancy separation to forward traffic correctly. To enable individual tenants to utilize this environment, the resource provider for the data center, for example, a cloud service provider (CSP), sets up a respective VPN gateway for each tenant to provide access to each respective tenant. This infrastructure is problematic because per-tenant VPN gateway deployment utilizes network resources and increases the management overhead for the infrastructure of the data center as a whole. Thus, both capital and operational expenses can increase dramatically as the number of tenants of the multi-tenant data storage environment expands.

SUMMARY

Shortcomings of the prior art are overcome and additional advantages are provided through the provision of a method to interconnect external networks of different tenants in a shared environment through a shared connection. The method includes, for instance: obtaining, by one or more processor, data from a virtual network of a tenant and an identifier of the tenant, wherein the virtual network of the tenant is one of at least two virtual networks in a shared computing environment wherein the at least two virtual networks overlay a physical network; based on obtaining the identifier of the tenant, setting, by the one or more processor, the identifier in metadata of the data; based on the identifier in the metadata, identifying, by the one or more processor, a network connection associated with the tenant; identifying, by the one or more processor, a policy of the network connection and processing the data with the policy to create processed data; and transmitting, by the one or more processor, the processed data through the network connection.

Shortcomings of the prior art are overcome and additional advantages are provided through the provision of a computer program product interconnect external networks of different tenants in a shared environment through a shared connection. The computer program product includes, for instance, a computer readable storage medium readable by a processing circuit and storing instructions for execution by the processing circuit for performing a method including: obtaining, by the one or more processor, data from a virtual network of a tenant and an identifier of the tenant, wherein the virtual network of the tenant is one of at least two virtual networks in a shared computing environment wherein the at least two virtual networks overlay a physical network; based on obtaining the identifier of the tenant, setting, by one or more processor, the identifier in metadata of the data; based on the identifier in the metadata, identifying, by the one or more processor, a network connection associated with the tenant; identifying, by the one or more processor, a policy of the network connection and processing the data with the policy to create processed data; and transmitting, by the one or more processor, the processed data through the network connection.

Computer systems and methods relating to one or more aspects of the technique are also described and may be claimed herein. Further, services relating to one or more aspects of the technique are also described and may be claimed herein.

Additional features and are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawings in which:

DETAILED DESCRIPTION

Figure 1:
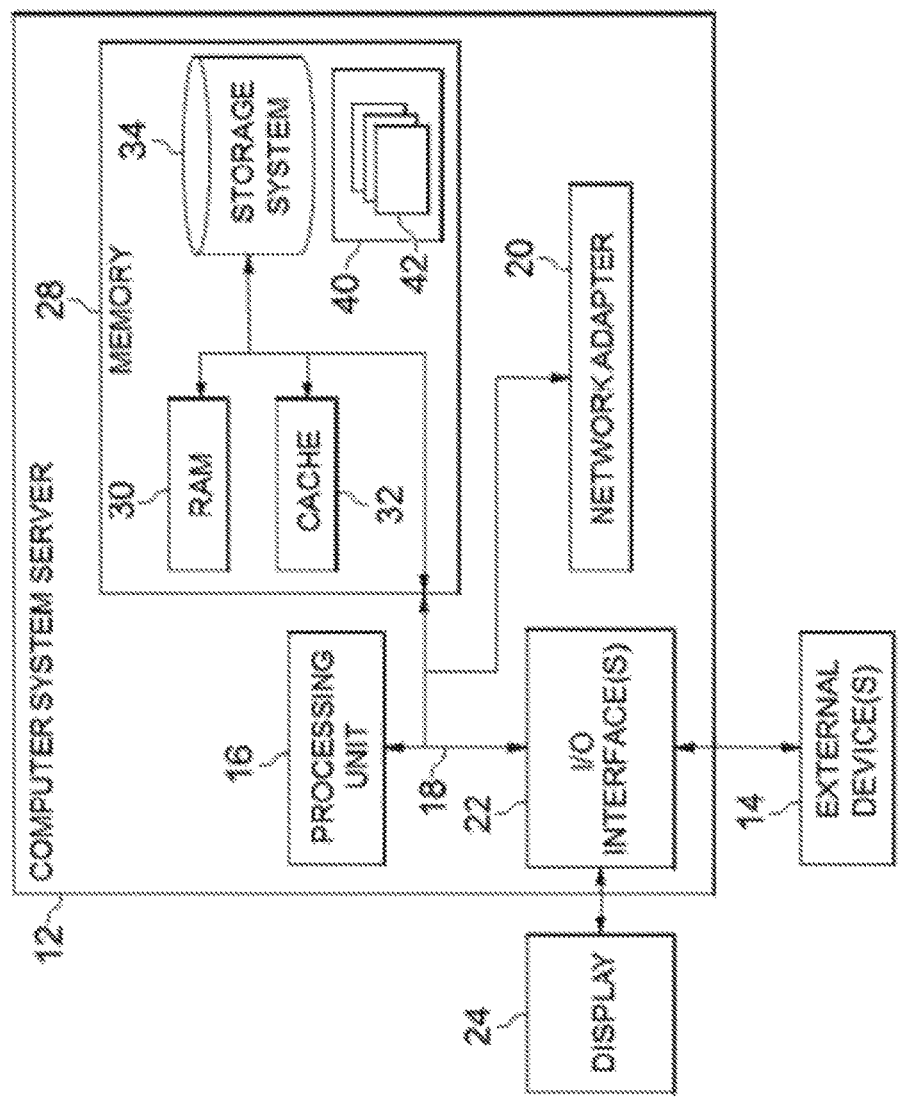
FIG. 1 depicts a cloud computing node, in accordance with one or more aspects set forth herein.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention.

Embodiments of the present invention recognize that when a controller, such as a CSP, in a multi-tenant environment, deploys a VPN gateway for each individual tenant to access that individual tenant's overlay network, the overhead for and the complexities of managing the environment greatly increases with each additional tenant, which limits the ability of the environment to function effectively. The time and labor required to maintain these separate VPN connections impacts the efficiency with which the environment is able to operate.

The present disclosure provides, in part, methods, computer programs, and/or computer systems, for utilizing a tenant identifier in the metadata of a packet to enable a VPN overlay gateway, interfacing with a data center physical underlay network, and an Internet-facing network, to tunnel tenant frames to and from other Network Virtualization Edges (NVEs) (i.e., network entities that sit at the edge of underlay networks and implement network virtualization functionality) within the data center, and conversely, to tunnel tenant IP packets to and from remote VPN peers. Embodiments of the present invention include methods, computer programs, and/or computer systems that implement a multi-tenant VPN-Overlay gateway for interconnecting external networks, belonging to different tenants, with overlay networks. One advantage of certain embodiments of this invention is that by utilizing certain aspects, tenants can share a gateway to connect their respective remote networks to the overlay networks through secure connections, including but not limited to, respective secured VPN tunnels.

Certain embodiments of the present invention represent a technological improvement over prior systems and methods for managing multi-tenant environments by providing multi-tenancy access by utilizing fewer VPN-overlay gateways than tenants, including, utilizing a single VPN-overlay gateway to accommodate all the tenants of a given data center. This aspect of certain embodiments of the present invention provides an advantage by greatly decreasing the overall capital expenditure associated with a multi-tenant environment by enabling different tenants of a physical data storage environment, including but not limited to, a data center which may be comprised of a cloud computing environment, to share a common VPN-overlay gateway, eliminating the necessity of providing a gateway for each tenant and the associated costs of any hardware and/or software required to provide the individual gateways.

Advantages of certain embodiments of the present invention are particularly relevant to multi-tenant environments because as the number of tenants increases, the number of VPN-overlay gateways can remain constant, which greatly reduces the management overhead of the environment, including time and costs associated with deployment, configuration, and change management, across the environment.

Certain embodiments of the present invention may provide additional advantages to overall system efficiency and eliminate unnecessary expenditures by utilizing existing VPN clients and are compatible with legacy hardware and software within data centers and other data storage environments.

Certain embodiments of the present invention provide further advantages by being platform independent such that aspects of the invention may be integrated into both hardware and network function virtualization (NFV) based VPN gateways. Embodiments of the present invention may also be protocol independent and may utilize protocols including, but not limited to, IPSec VPN, and SSL VPN.

Aspects of various embodiments of the present invention provide a unique solution for separately managing network traffic in multiple virtual networks across a single physical environment shared by multiple tenants, by providing at least one shared VPN-overlay gateway, rather than a separate gateway for each tenant. The approach is unique at least because in an overlay network, the separation of tenants is hidden from the underlying physical infrastructure, which renders counterintuitive using a shared network element to transport data to a destination that is a tenant-specific virtual resource. In fact, current systems are configured specifically to task dedicated resources with these tenant-specific virtual destinations.

For clarity, the term data center in the present disclosure is utilized to represent a hardware and/or software environment capable of providing network resources at least one tenant, including providing resources, such as those that comprise virtual networks, for use by the tenant. The data center may represent resources across one or more locations and may include a cloud computing environment. Additionally, throughout the present disclosure, the terms overlay network and virtual network are used interchangeably.

As discussed above, the shared environment may be a cloud and therefore some embodiments of the present invention may offer functionality described below to a user in a Software as a Service (SaaS) model, i.e., aspects of the method described are executed by one or more processors in a cloud infrastructure. Embodiments of the present invention that utilize the cloud infrastructure may be especially advantageous when it is the resources of the cloud that are providing various services to different users of the cloud, wherein the individual services may be executed on dedicated virtual resources within the cloud computing environment. By utilizing the cloud infrastructure, in certain embodiments of the present invention, the potential to utilize embodiments of the present invention to provide dedicated virtual resources to a large tenant pool may be realized.

FIGS. 1-4 depict various aspects of computing, including cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, mobile devices, personal data assistants, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
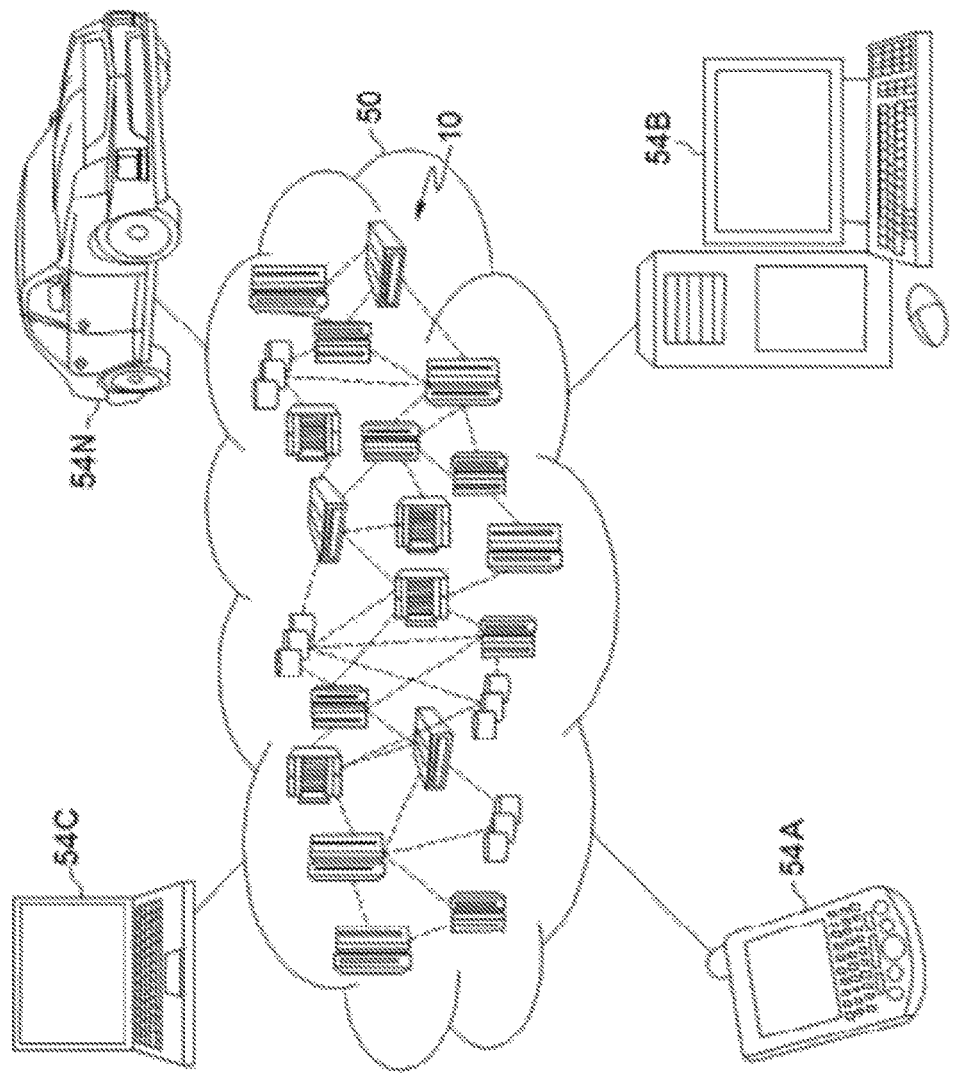
FIG. 2 depicts a cloud computing environment, in accordance with one or more aspects set forth herein.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
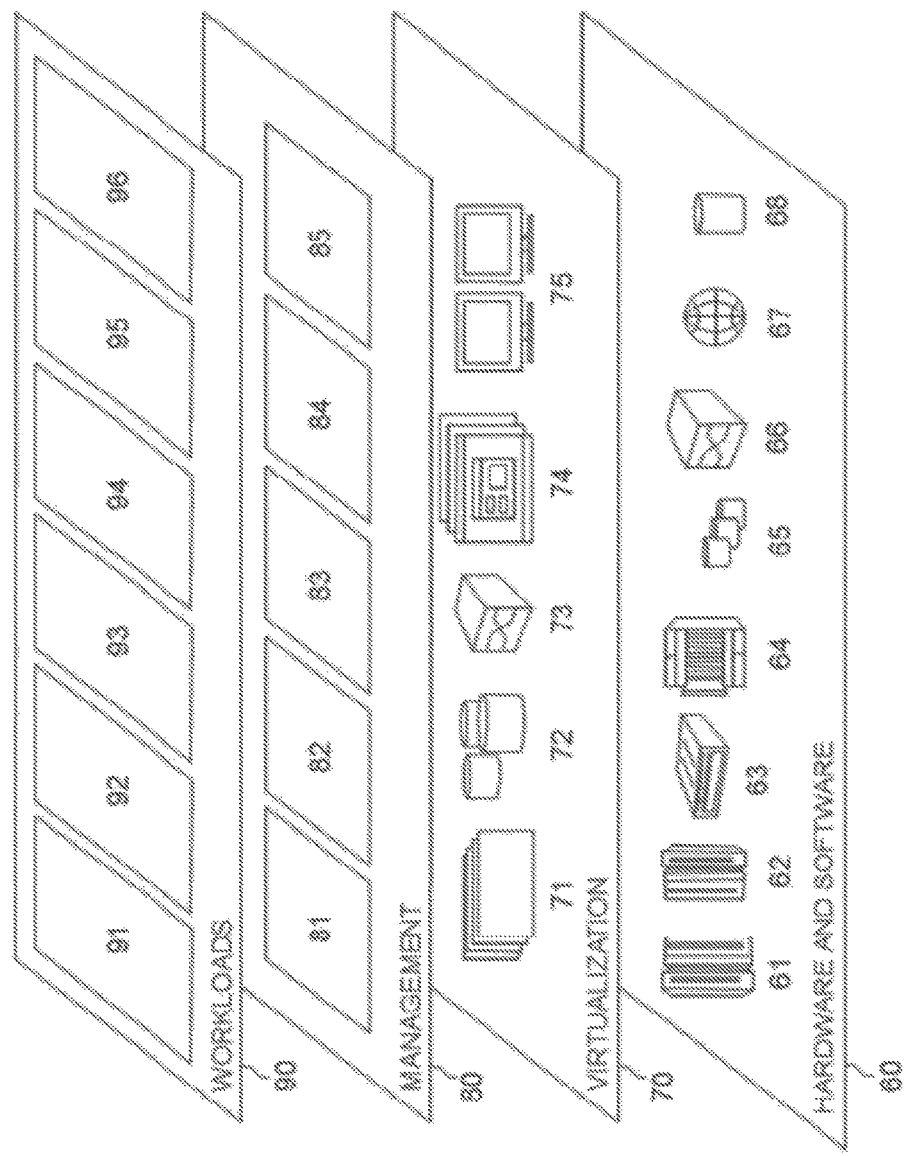
FIG. 3 depicts abstraction model layers, in accordance with one or more aspects set forth herein.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and identifying a network connection associated with the tenant 96, as described herein. Element 96 can be understood as one or more program 440 described in FIG. 4.

Figure 4:
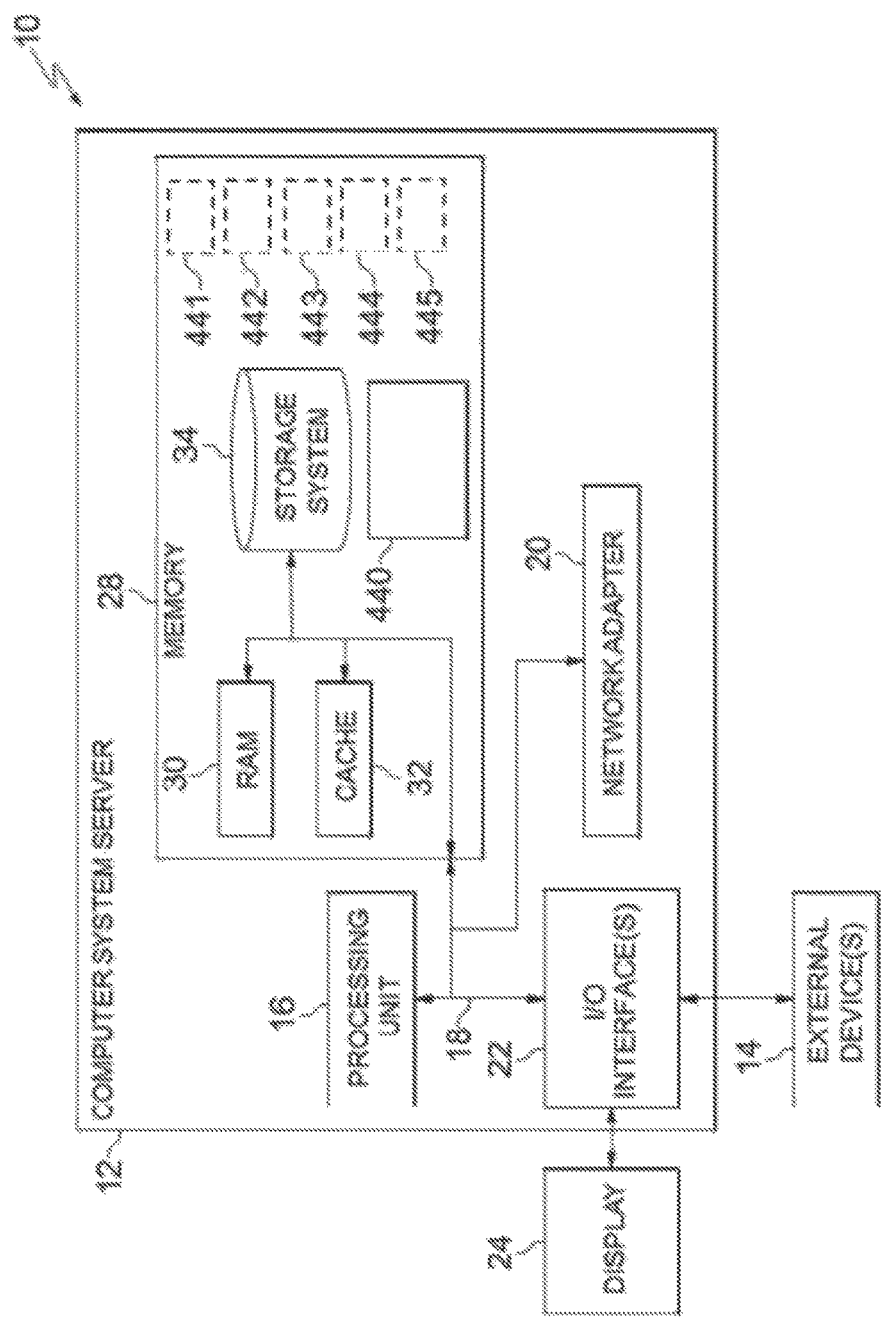
FIG. 4 depicts a hardware overview of a computing node, in accordance with one or more aspects set forth herein.

FIG. 4 depicts a hardware overview of a computing node 10, in accordance with one or more aspects set forth herein.

Program/utility 40 as set forth in FIG. 1 can include one or more program 440 as set forth in FIG. 4, and program/utility 40, including, for example one or more program 440 to identify a network connection associated with the tenant, as described in work layer 96. Program/utility 40 as set forth in FIG. 1 can include one or more program 440 and can optionally include some or all of one or more program 441, 442, 443, 444, 445.

One or more program 440 can have a set (at least one) of program modules, and may be stored in memory 28 by way of example, and not limitation, as well as an operating system, one or more application programs, other program modules, and program data. Each of the operating system, one or more application programs, other program modules, program data, and one or more program, or some combination thereof, may include an implementation of a networking environment. One or more program 440 (and optionally at least one of one or more program 441, 442, 443, 444, 445) generally carry out the functions and/or methodologies of embodiments of the invention as described herein.

Referring again to FIG. 4:

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

As aforementioned, absent the unique functionality of certain embodiments of the present invention, shared physical environments that provided dedicated virtual resources for multiple tenants were taxed by the requirement of providing dedicated communication channels from each tenant to that tenant's virtual resources. This type of technical environment is depicted in FIG. 5.

Figure 5:
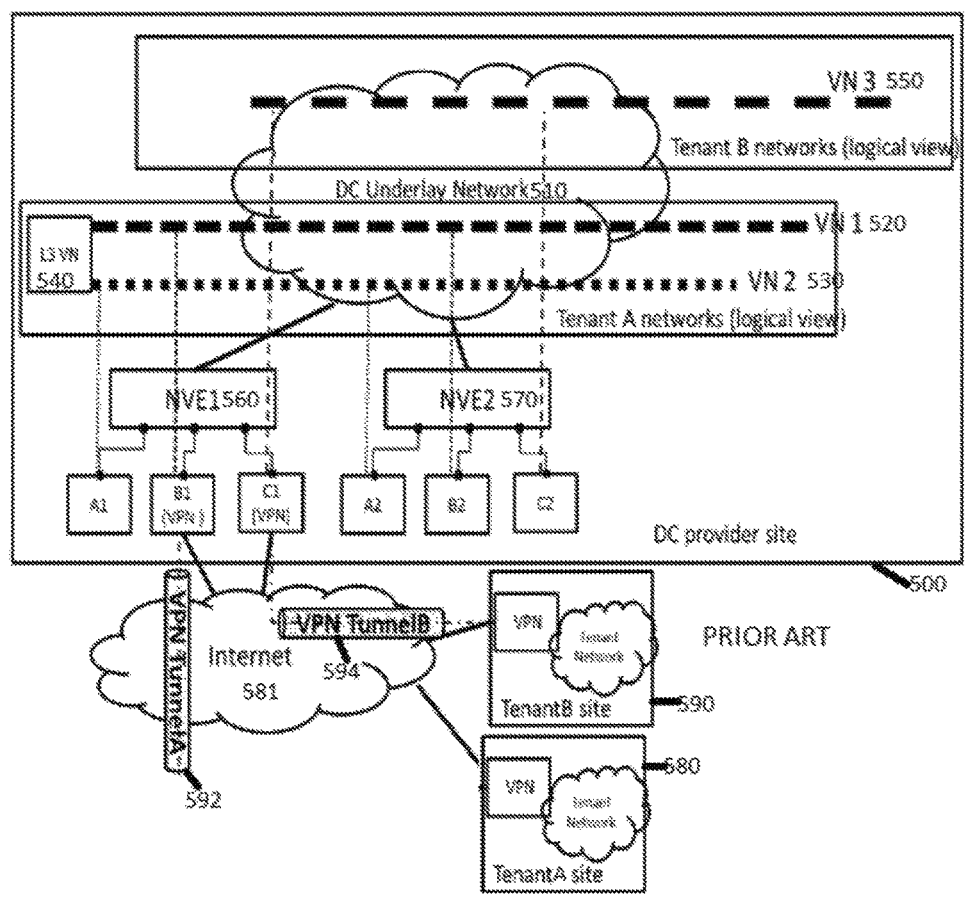
FIG. 5 depicts an example of existing overlay network framework.

FIG. 5 depicts an example of existing overlay network framework, and illustrates how tenant overlay networks can be accessed from the Internet 581 with each tenant of a data center 500 utilizing an individual VPN tunnel (e.g., VPN TunnelA 592 and VPN TunnelB 594) to access tenant-specific virtual networks formed from a (physical) data center underlay network 510. One or more program 440 (as depicted in FIG. 4) executing on at least one resource of the data center 500 of FIG. 5, uses an underlay network 510 to provide tenants with virtual networks (i.e., overlay networks). As seen in the depicted logical views, each tenant may access its virtual network(s). For example, referring to FIG. 5, the aforementioned one or more program 440 provides Tenant A with a two virtual networks VN1 520, and VN2 530, which are part of a layer 3 (L3) virtual network 540. The one or more program 440 provides Tenant B with a virtual network, VN3 550.

Tenant overlay networks are referred to herein as virtual networks (VNs). To create these virtual networks from the underlay network 510, the technical environment of the data center 100 is also comprised of a Network Virtualization Edge (NVE), for each tenant. In the data center 500, NVE1 560 and NVE2 570, are network entities that sit on the edge of the underlay network 510. Program 440 (FIG. 4) executing on at least one computing resource in the data center 500 and/or accessible to at least one resource in the data center 500 utilizes the NVEs to implement layer 2 (L2) or layer 3 (L3) network virtualization functions.

As is the case in many shared environments, in FIG. 5, the tenants are not located in the same physical location at the data center 500 and connect to their respective virtual resources remotely. In this example, each tenant accesses the resources of its virtual environment within the data center 500 from its remote location, TenantA site 580, and TenantB site 590. One or more program 440 (FIG. 4) executing on at least one resource in the data center 500, e.g., a CSP, sets up a VPN gateway (e.g., VPN TunnelA 592 and VPN TunnelB 594) for each tenant to provide access to each tenant to its network(s). As more tenants utilize the data center 500, the more dedicated VPN gateways must be provided. For each tenant, the VPN gateway terminates the VPN tunnel and passes the packet to the virtual network.

Rather than tax a system with creating and supporting individual VPN gateways for each tenant of a multi-tenant environment, like in FIG. 5, embodiments of the present invention may be utilized to implement a multi-tenant VPN overlay gateway for interconnecting external networks with overlay networks. In an embodiment of the present invention, tenants may share VPN gateways, including but not limited to all tenants sharing a single VPN gateway, to connect their respective remote networks to overlay networks. Certain embodiment of the method of the present invention support multi-tenancy in a single VPN gateway for overlay-based networks.

Figure 6:
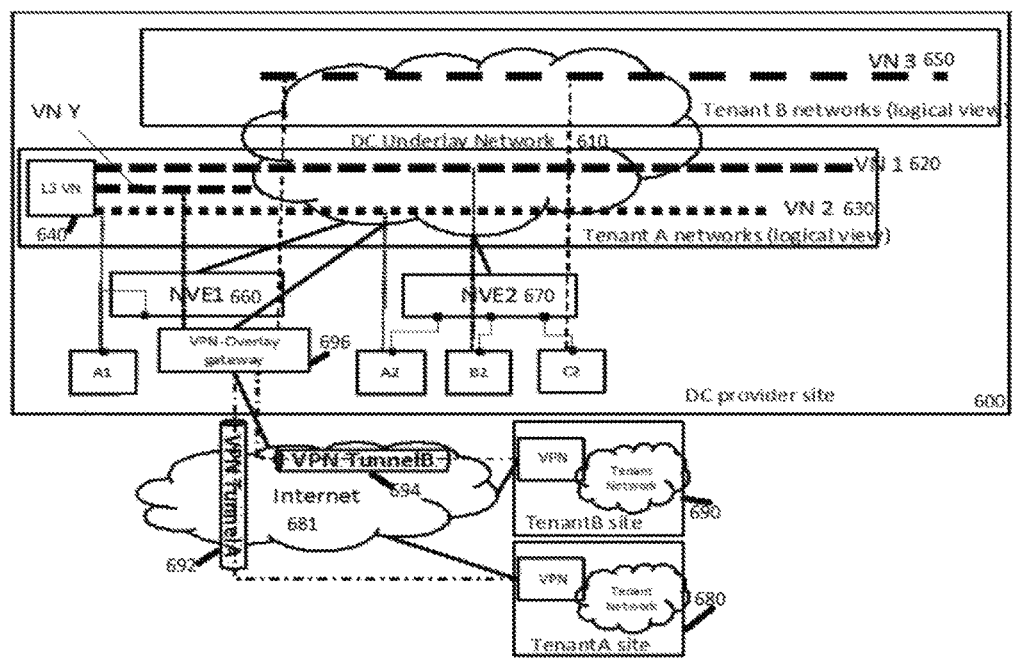
FIG. 6 depicts a shared multi-tenant environment utilizing certain aspects of an embodiment of the present invention, namely, a single VPN gateway, to connect tenants' their respective remote networks to overlay networks.

FIG. 6 depicts a shared multi-tenant environment, in this example, a data center 600, where the tenants may share a single VPN gateway, to connect their respective remote networks to overlay networks. In the environment of FIG. 6, a controlling entity, for example, the cloud service provider (CSP) executed one or more program 440 (FIG. 4) to configure and maintain a VPN Overlay Gateway 696 that the multiple tenants of the data center 600 (e.g., Tenant A and Tenant B) may utilize to access their respective virtual networks (e.g., VN1 620, and VN2 630, for Tenant A, and VN3 650, for Tenant B). In an embodiment of the present invention, VPN Overlay Gateway 696 has at least two interface; VPN Overlay Gateway 696 is communicatively coupled to a data center physical underlay network 610, and to an Internet-facing (and/or other public or shared) network, depicted in FIG. 6, as the Internet 681. The data center facing side of the VPN Overlay Gateway 696 may utilize an underlying network, such as, in this non-limiting example, the underlying L3 virtual network 640, to tunnel tenant frames to and from other network virtual environments (NVEs). The side of the gateway that faces the Internet 681 may use VPN to tunnel tenant IP packets to and from remote VPN peers.

In an embodiment of the present invention, VPN Overlay Gateway 696, by interfacing with both the data center 600 and the remote tenant sites (i.e., remote VPN peers), can route packets from the sites to the appropriate virtual network resources within the data center 600, and vice versa.

In an embodiment of the present invention, when the VPN Overlay Gateway 696 obtains an overlay encapsulated IP packet from a resource in the data center 600, one or more program 440 (FIG. 4) at the VPN Overlay Gateway 696 decapsulates the packet, extracts the inner packet, and routes the inner packet through the appropriate VPN tunnel to the appropriate remote VPN peer. Conversely, after receiving an encrypted IP packet from a resource at its Internet-facing side, the VPN Overlay Gateway 696 decrypts the packet and then inserts the decrypted packet to appropriate VN to tunnel it to the appropriate NVE within the data center 600.

As described in the context of FIG. 6, the VPN Overlay Gateway 696 conducts packets received from a VPN tunnel to the proper virtual network (VN), and the VPN Overlay Gateway 696 conducts frames obtained from an NVE to the proper VPN tunnel. For ease of understanding, only, the functionality of the VPN Overlay Gateway is described as comprising three modules: an NVE Module, a Conductor Module, and a VPN Module. However, as understood by one of skill in the art, the implementation of the present invention is not limited by this description. This approach is utilized merely to assist in describing certain aspects of the invention with clarity.

Figure 7:
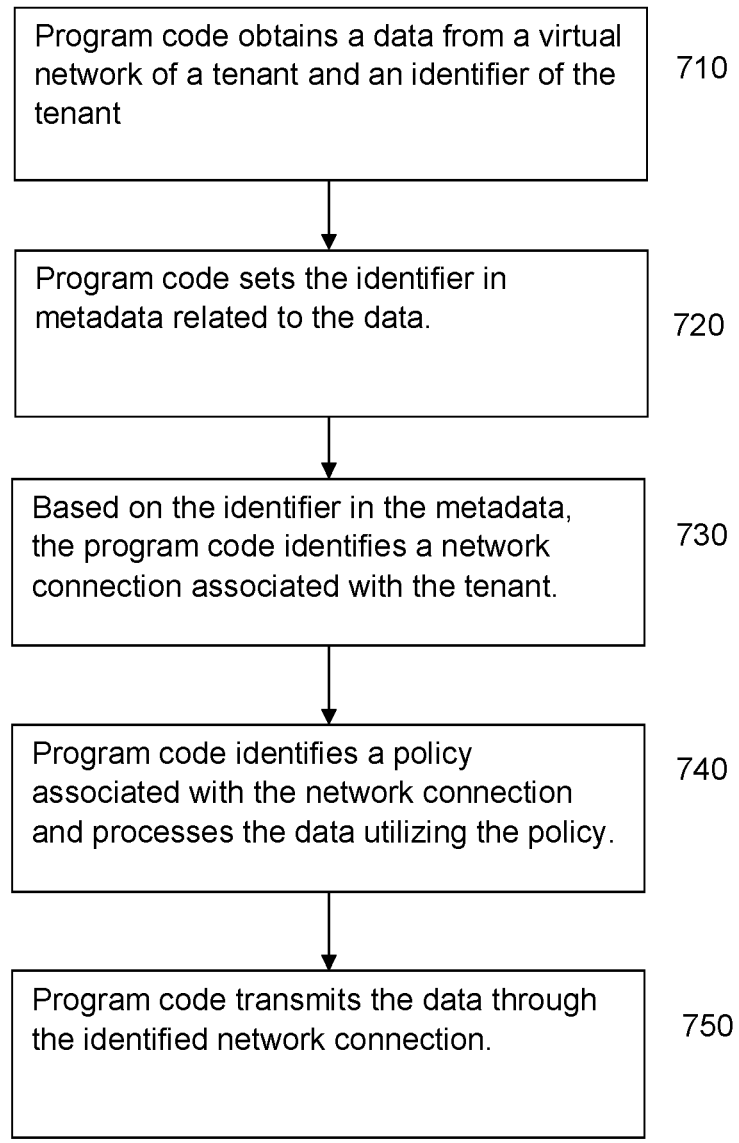
FIG. 7 depicts a workflow of an embodiment of the present invention.
Figure 8:
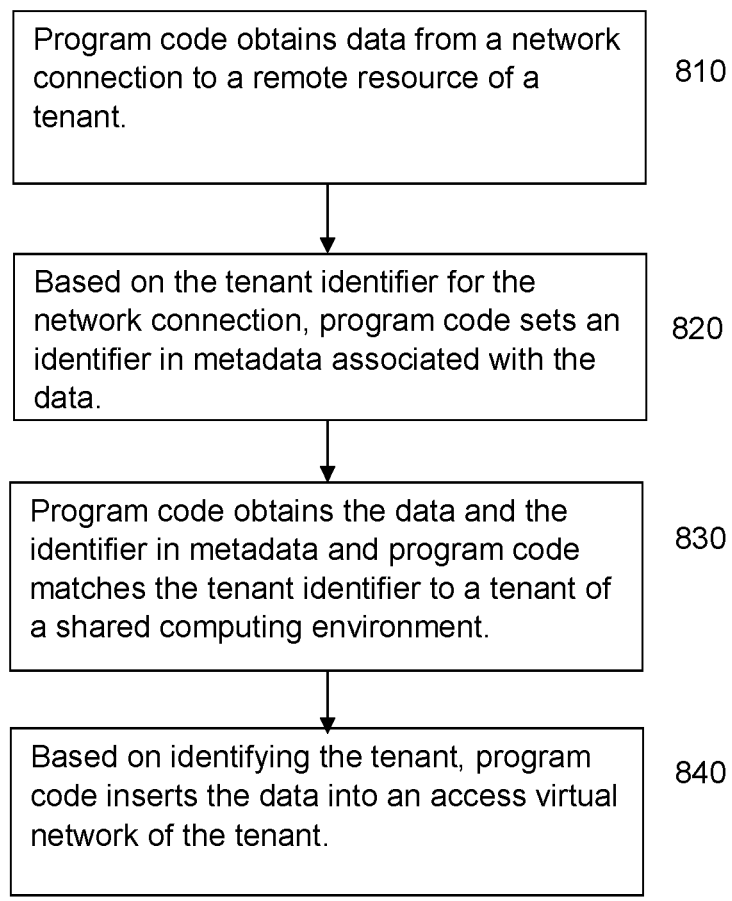
FIG. 8 depicts a workflow of an embodiment of the present invention.
Figure 9:
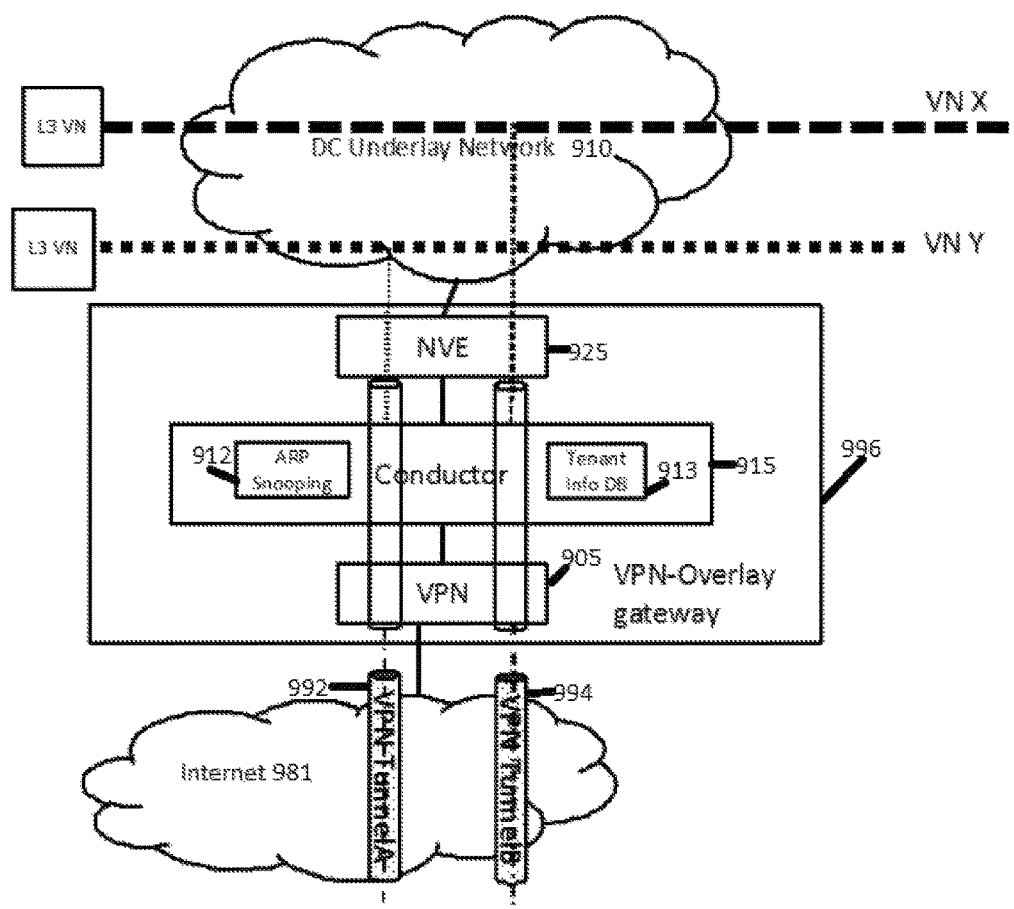
FIG. 9 depicts aspects of a VPN Overlay Gateway in an embodiment of the present invention.

FIGS. 7-8 provide workflow diagrams of methods utilized by a VPN Overlay Gateway to route data from virtual tenant resources in a shared environment to remote tenant resources and vice versa. Specifically, FIG. 7 depicts an example of the flow of data from virtual tenant resources in a shared environment to remote tenant networks and FIG. 8 depicts the flow of data from remote tenant networks to the virtual tenant resources in a shared environment. FIG. 9 provides additional detail into certain embodiments of the present invention by depicting certain elements of a proposed technical architecture. For clarity and consistency, both the workflows and the architecture overview denote one or more program 440 within the three modules performing certain aspects of the disclosed method.

FIG. 7 depicts a workflow of an embodiment of the present invention where data is obtained from a tenant's virtual network in a shared environment and routed to that tenant's remote network. FIG. 8 depicts a workflow of an embodiment of the present invention where data is obtained from a tenant's remote network and routed to the tenant's virtual network in the shared environment. Portions of the methods are illustrated with reference to the technical environment depicted in FIG. 9.

Referring to FIG. 7, one or more program 440 (FIG. 4) (e.g., in the NVE Module 925) obtains a data from a virtual network of a tenant and an identifier of the tenant (710). In an embodiment of the present invention, the one or more program 440 obtains the data as a frame. In an embodiment of the present invention, when the program code obtains the data, which is a frame, the program code remove the header of the frame. In an embodiment of the present invention, the virtual network of the tenant is one of at least two virtual networks in a shared computing environment where the at least two virtual networks overlay a physical network. In an embodiment of the present invention, the identifier of the tenant is an origination point of the data, which is a logical connection point between the physical network and the virtual network.

Based on obtaining the identifier of the tenant, the program code sets the identifier in metadata related to the data (720) (e.g., in the Conductor Module 915). For example, in an embodiment of the present invention where the program code removed an outer header leaving a packet, the program code sets the identifier in the metadata of the remaining packet. In an embodiment of the present invention, the program code determines whether the data utilizes an address resolution protocol (ARP). In this embodiment, the ARP module maintains an IP-MAC mapping table for each tenant, enabling the routing of the data utilizing this table, which will be described in greater detail later.

Based on the identifier in the metadata, the program code identifies a network connection associated with the tenant (730) (e.g., in the VPN Module 905). In an embodiment of the present invention, the network connection is a VPN tunnel coupled to a remote network of the tenant. In an embodiment of the present invention, the network connection is a VPN tunnel over the Internet. In an embodiment of the present invention, the program code utilizes at least one field in the packet and the tenant identifier to identify the network connection.

The program code identifies a policy associated with the network connection and processes the data utilizing the policy (740).

In an embodiment of the present invention, the program code transmits the data through the identified network connection (750). In an embodiment of the present invention, the program code transmits a pre-processed packet through a VPN tunnel over the Internet. In an embodiment of the present invention, the VPN tunnel is coupled to a remote network of the network.

Referring now to FIG. 8, the program code obtains data from a network connection to a remote resource of a tenant (810) (e.g., in the VPN Module 905) and a tenant identifier for the network connection. In an embodiment of the present invention, when obtaining the data, in a packet, the program code enforces a security policy of the network connection to decrypt the packet. In an embodiment of the present invention, the network connection is a VPN tunnel from a remote resource of a tenant.

Based on the tenant identifier for the network connection, the program code sets an identifier in metadata associated with the data (820). In an embodiment of the present invention, the data comprises a packet and the metadata is part of the packet.

The program code obtains the data and the identifier in metadata (e.g., the packet) and the program code matches the tenant identifier to a tenant of a shared computing environment (830) (e.g., in the Conductor Module 915). In an embodiment of the present invention, the program code matches the identifier to a tenant using an entry in a tenant table 913.

In an embodiment of the present invention, based on identifying the tenant, the program code inserts the data into an access virtual network of the tenant (840). In an embodiment of the present invention, the data is inserted through a logical connection point on a network virtualization edge coupled to the virtual network. In an embodiment of the present invention, the virtual network is coupled to a system of the tenant.

In an embodiment of the present invention, the data inserted into the virtual network is a frame. In this embodiment, the program code obtained the packet and reconstructed a header to create the frame. In an embodiment of the present invention, the program code reconstructed the header by utilizing the identifier in the metadata to setting a next hop MAC address as a destination MAC address and a pseudo MAC as a source MAC address. Based on setting these addresses, the program code inserted the frame into the access VN through the corresponding the logical connection point on the NVE, for connecting a tenant system to a VN.

Additional details of certain embodiments of the invention described in FIG. 7-8 are described in the context of FIG. 9. Referring to FIG. 9, an embodiment of the VPN Overlay Gateway 996 of the present invention. The VPN Overlay Gateway 996 comprises one or more program 440 (FIG. 4) and the one or more program 440 that can be described as three modules: a VPN Module 905, a Conductor Module 915, and an NVE Module 925. This modular separation of the one or more program 440 is not limiting and offered only to lend clarity to this description. For ease of understanding, this disclosure will describe each module separately before discussing their combined functionality.

In an embodiment of the present invention, an NVE Module 925 is communicatively coupled to the physical underlay network 910 of the data center 900, and the Conductor Module 915. At this orientation, the NVE had two primary roles. First, the NVE Module 925 obtains data from resources in the shared environment and sends the data to the Conductor Module 915 in a manner that assists the Conductor Module 915 in determining which remote tenant environment should receive the data. Second, the NVE Module 925 obtains data from the Conductor Module 915 and routes it to the correct tenant virtual network and/or resource within the shared environment. Thus, the NVE Module 925 communicates with the underlay network 910 to route tenant data (e.g., tunnel tenant frames) to and from NVEs within the shared computing environment. The NVE Module 925 also communicates with the Conductor Module 915 to obtain data (e.g., Ethernet frames) from the Conductor Module 915 and to route this data to NVEs within the shared computing environment.

The NVE Module 925 aids in routing data from a tenant virtual resource within a shared computing environment to the remote network of that tenant, in part, by tracking the movement of the data in the data center 900, i.e., where the data originated from so that one or more program 440 can associate the data with the correct tenant as the data moves through the system. For example, in an embodiment of the present invention, the NVE Module 925 may communicate with the Conductor Module 915 via a logical connection point on the NVE for connecting a tenant system to a virtual network. In a further embodiment of the present invention, the NVE Module 925 obtains data (e.g., a frame) and sets an access VN identifier in metadata associated with the data. Then, when the NVE Module 925 sends the data out of the virtual port, one or more program 440 (e.g., in the NVE Module 925) sets the VN identifier in the metadata associated with the data. In a further embodiment of the present invention, the NVE Module 925 includes multiple internal/virtual ports through which it interacts with the Conductor Module 915. In this embodiment, the one or more program 440 can identify a logical connection point on the NVE for connecting a tenant system to a VN through the local port identifier, as each port is designated as this type of logical connection for a specific VN, and by identifying the logical connection, the one or more program 440 can route the frame to a resource in the correct tenant's virtual environment, such as an NVE.

In an embodiment of the present invention, the Conductor Module 915 acts as an intermediary between the NVE Module 925 and the VPN Module 905 and routes data between them. In addition to tracking data using port identifiers, the NVE Module 925 may also employ a tenant table 913 to track data ownership, which the Conductor Module 915 can reference when routing packets between the VPN Module 905 and the NVE Module 925, and vice versa. In an embodiment of the present invention, the NVE Module 925 makes an entry for each tenant of the data center 900 in the tenant table 913. For example, the one or more program 440 may index each tenant of the shared environment in the tenant table 913.

The one or more program 440 utilizes the described identifiers and identification methods to identify the origin of data, and therefore, the destination of data (e.g., frames and packets), by utilizing the metadata associated with the object. In an embodiment of the present invention, the tenant information includes an identifier of the VPN access VN, the default next hop IP address, and/or a local pseudo IP address with subnet mask. These identifiers aid the one or more program 440 in identifying the tenant associated with data and routing the data accordingly. The one or more program 440 may use the VPN access VN for egressing the packets from VPN tunnels to access the tenant overlay networks, the VNs. The access VN can connect to a L3 VN to yield interconnectivity with other VNs through routing. The one or more program 440 may utilize the next hop IP address to identify access point for the access VN. The one or more program 440 may use the local pseudo IP address as the next hop to reach to the external network at the other end of a VPN tunnel as a corresponding pseudo MAC address is accompanied with the pseudo IP address. If a tenant only employs 1 VN, that VN can be used as the access VN, and the next hop IP is not necessary in this case to identify the destination for the data. The next hop IP address in different tenant entry can be overlapped, as can the local pseudo IP address.

Returning to FIG. 9, in an embodiment of the present invention, the VPN Module 905 is communicatively coupled to both the Conductor Module 915 and to the tenants' remote locations, which it may access utilizing VPN tunneling and the Internet, (e.g., via VPN TunnelA 992 and VPN TunnelB 994).

In an embodiment of the present invention, the VPN Module 905 is comprised of a VPN server that can handle data encryption, authentication, authorization and establishing secured tunnels with peers.

Like the NVE Module 925, in an embodiment of the present invention, the VPN Module 905 also assists in tracking which tenant is associated with data that is being routed through a shared environment so that this data is ultimately routed to that tenant's virtual network in the shared environment. In an embodiment of the present invention, the VPN Module 905 obtains data from the tenants' remote networks via a secure connection on a public network, e.g., a VPN tunnel, such as VPN TunnelA 992, over the Internet 981, and associates a credential to authenticate a tenant identifier. After the VPN Module 905 establishes a tunnel, the program code associates the tunnel with the tenant identifier of a credential used for the authentication. Thus, when the VPN Module 905 processes an inbound packet from a remote peer, in addition to decrypting the packet, instead of going through an IP routing pipeline, as seen in FIG. 5, the one or more program 440 sets the tenant identifier in the packet's metadata to an identifier associated with the tunnel from which the program code in the VPN Module 905 obtained the packet, and passes the decrypted packet to Conductor Module 915 for further processing.

The VPN Module 905 also obtains packets from the Conductor Module 915. In an embodiment of the present invention, upon obtaining data (e.g., a packet) from the Conductor Module 915, based on identifying information in the data, including but not limited to, a tenant identifier in the metadata of a packet and/or other fields in a packet, the VPN Module 905 routes the data to a peer (e.g., via a tunnel to the peer's remote network) associated with the virtual network from which the NVE Module 925 originally obtained the data.

In an embodiment of the present invention, the VPN Module 905 comprises an IPsec VPN server. The VPN Module 905 may further comprise a Peer Authentication Database (PAD) and/or a Security Association Database (SAD). These databases include a field to hold a tenant identifier. To form an IPsec security association (SA), the VPN Module 905 sets the tenant ID to a corresponding PAD entry which is used for the authentication. The VPN Module 905 on the IPSec VPN server processes inbound packets and sets the tenant identifier of the IPsec SA to the metadata associated with the packet. This one or more program 440 then adds a tenant identifier selector in Security Policy Database (SPD), which enables overlapped IP address for different tenants.

In an embodiment of the present invention, the one or more program 440 in the VPN Module 905 may utilize SPD for outbound traffic. With the tenant identifier selector, the outbound packets of different tenants can match to their corresponding outbound SA without ambiguity and the VPN Module 905 can deliver the packets to the correct peers successfully.

Returning to FIG. 9, as aforementioned, the Conductor Module 915 is communicatively coupled to the VPN Module 905 and the NVE Module 925. In an embodiment of the present invention, the Conductor Module 915 mediates between the NVE Module 325 and the VPN Module 305 to data between the virtual networks of various tenants and their respective VPN tunnels. In an embodiment of the present invention, conduct packets obtained from the VPN-facing side to the correct VN, the Conductor Module 915 conducts the frames received from its NVE-facing side, to the correct VPN tunnels.

In an embodiment of the present invention, the Conductor Module 915 may include an Address Resolution Protocol (ARP) sub-module. In this embodiment, upon obtaining a frame from the NVE Module 925, the Conductor Module 915, if it is an ARP packet, passes the packet to the ARP snooping sub-module 912 for further processing.

In a further embodiment of the present invention, the Conductor Module 915 sets the tenant identifier in the metadata associated with the frame if the NVE Module 925 has not done so and passes the frame to VPN Module 905 for further processing.

In a further embodiment of the present invention, to aid in routing packets, the ARP snooping sub-module 912 may monitor ARP packets and maintain an IP-MAC mapping table for each tenant access VN. The ARP snooping may also resolve the next hop IP address of a tenant entry to a corresponding MAC address by sending an ARP request to the next hop IP address through a logical connection point on the NVE for connecting a tenant system to a VN, for the VN associated with the frame. In an embodiment of the present invention, the ARP snooping sub-module 912 answers an ARP request to a local pseudo IP address with the pseudo MAC address. In this embodiment, the program code sends an ARP reply packet through the logical connection point for the VN, on which the initial request packet was received.

Upon receiving an IP packet from VPN Module 905, the Conductor Module 915 may match a tenant identifier, for example, in the packet metadata, to an entry in a tenant table 913. In an embodiment of the present invention one or more program 440 in the Conductor Module 915 reconstructs an L2 Ethernet header for an IP packet by setting an appropriate next hop MAC address as the destination MAC address and the pseudo MAC address as the source MAC address. Based on setting these addresses, the Conductor Module 915 inserts the frame into the access VN through the corresponding a logical connection point on the NVE for connecting a tenant system to a VN on the NVE Module 925.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer-implemented method comprising:
   obtaining, by one or more processors, data from a network connection to a remote resource of a remote network of a first tenant, a first tenant identifier for the network connection of the first tenant, additional data from a network connection to a remote resource of a remote network of a second tenant, and a second tenant identifier for the network connection of the second tenant, wherein the network connection to the remote resource of the remote network of the first tenant and the network connection to the remote resource of the remote network of the second tenant comprise a shared virtual private network tunnel over a public Internet connection, wherein the virtual private network tunnel is coupled to remote networks of at least two tenants of at least two virtual networks;
   based on the first tenant identifier for the network connection of the first tenant, setting, by the one or more processors, an identifier of the first tenant in metadata associated with the data;
   based on the second tenant identifier for the network connection of the second tenant, setting, by the one or more processors, an identifier of the second tenant in metadata associated with the additional data;
   obtaining, by the one or more processors, the data and the identifier in the metadata associated with the data and matching the tenant identifier to the first tenant of the shared computing environment;
   based on identifying the first tenant of the shared computing environment, inserting, by the one or more processors, the data into an access virtual network of the first tenant of the shared computing environment, wherein the access virtual network of the first tenant of the shared computing environment is associated with one virtual network of the at least two virtual networks in the shared computing environment, and wherein the at least two virtual networks overlay a physical network, and wherein each virtual network of the at least two virtual networks is a virtual network of a tenant;
   obtaining, by the one or more processors, the additional data and the identifier in the metadata associated with the additional data and matching the tenant identifier to the second tenant of the shared computing environment; and
   based on identifying the second tenant of the shared computing environment, inserting, by the one or more processors, the data into an access virtual network of the second tenant of the shared computing environment, wherein the access virtual network of the second tenant of the shared computing environment is associated with another virtual network of the at least two virtual networks in the shared computing environment.

2. The computer-implemented method of claim 1, wherein the inserting comprises:
   inserting, by the one or more processors, the data into the access virtual network of the first tenant through a logical connection point on a network virtualization edge coupled to the one virtual network.

3. The computer-implemented method of claim 1, wherein obtaining the data from the network connection to a remote resource of the first tenant and the tenant identifier for the network connection of the first tenant, comprises:
   contemporaneously to obtaining the data, in a packet, enforcing, by the one or more processors, a security policy to decrypt the packet.

4. The computer-implemented method of claim 1, wherein matching the tenant identifier to the first tenant of the shared computing environment comprises locating the first tenant in an entry in a tenant table of the shared computing environment.

5. The computer-implemented method of claim 1, wherein inserting, the data into the access virtual network of the first tenant comprises inserting a frame into the access virtual network of the first tenant.

6. The computer-implemented method of claim 5, wherein obtaining the data and the identifier in the metadata and matching the tenant identifier to the tenant of a shared computing environment further comprises:
  obtaining, by the one or more processors, the data as a packet; and
  reconstructing, the one or more processors, a header of the packet to create the frame.

7. The computer-implemented method of claim 6, the reconstructing comprising:
  utilizing, by the one or more processors, the identifier in the metadata to set a next hop media access control (MAC) address as a destination MAC address and a pseudo MAC address as a source MAC address.

8. The computer-implemented method of claim 7, the inserting comprising:
  based on setting the destination MAC address and the source MAC address, inserting, by the one or more processors, the frame into the access virtual network through a corresponding logical connection point on a network virtualization edge, for connecting the remote resource of a tenant to the one virtual network.

9. A computer program product comprising:
  a computer readable storage medium readable by one or more processors and storing instructions for execution by the one or more processors for performing a method comprising:
    obtaining, by the one or more processors, data from a network connection to a remote resource of a remote network of a first tenant, a first tenant identifier for the network connection of the first tenant, additional data from a network connection to a remote resource of a remote network of a second tenant, and a second tenant identifier for the network connection of the second tenant, wherein the network connection to the remote resource of the remote network of the first tenant and the network connection to the remote resource of the remote network of the second tenant comprise a shared virtual private network tunnel over a public Internet connection, wherein the virtual private network tunnel is coupled to remote networks of at least two tenants of at least two virtual networks;
    based on the first tenant identifier for the network connection of the first tenant, setting, by the one or more processors, an identifier of the first tenant in metadata associated with the data;
    based on the second tenant identifier for the network connection of the second tenant, setting, by the one or more processors, an identifier of the second tenant in metadata associated with the additional data;
    obtaining, by the one or more processors, the data and the identifier in the metadata associated with the data and matching the tenant identifier to the first tenant of the shared computing environment;
    based on identifying the first tenant of the shared computing environment, inserting, by the one or more processors, the data into an access virtual network of the first tenant of the shared computing environment, wherein the access virtual network of the first tenant of the shared computing environment is associated with one virtual network of the at least two virtual networks in the shared computing environment, and wherein the at least two virtual networks overlay a physical network, and wherein each virtual network of the at least two virtual networks is a virtual network of a tenant;
    obtaining, by the one or more processors, the additional data and the identifier in the metadata associated with the additional data and matching the tenant identifier to the second tenant of the shared computing environment; and
    based on identifying the second tenant of the shared computing environment, inserting, by the one or more processors, the data into an access virtual network of the second tenant of the shared computing environment, wherein the access virtual network of the second tenant of the shared computing environment is associated with another virtual network of the at least two virtual networks in the shared computing environment.

10. The computer program product of claim 9, wherein the inserting comprises:
  inserting, by the one or more processors, the data into the access virtual network of the first tenant through a logical connection point on a network virtualization edge coupled to the one virtual network.

11. The computer program product of claim 9, wherein obtaining the data from the network connection to a remote resource of the tenant and the tenant identifier for the network connection of the first tenant, comprises:
  contemporaneously to obtaining the data, in a packet, enforcing, by the one or more processors, a security policy to decrypt the packet.

12. The computer program product of claim 9, wherein matching the tenant identifier to the first tenant of the shared computing environment comprises locating the first tenant in an entry in a tenant table of the shared computing environment.

13. The computer program product of claim 9, wherein inserting, the data into the access virtual network of the first tenant comprises inserting a frame into the access virtual network of the first tenant.

14. The computer program product of claim 13, wherein obtaining the data and the identifier in the metadata and matching the tenant identifier to the tenant of a shared computing environment further comprises:
  obtaining, by the one or more processors, the data as a packet; and
  reconstructing, the one or more processors, a header of the packet to create the frame.

15. The computer program product of claim 14, the reconstructing comprising:
  utilizing, by the one or more processors, the identifier in the metadata to set a next hop media access control (MAC) address as a destination MAC address and a pseudo MAC address as a source MAC address.

16. A system comprising:
  a memory;
  one or more processors in communication with the memory; and
  program instructions executable by the one or more processors via the memory to perform a method, the method comprising:
    obtaining, by the one or more processors, data from a network connection to a remote resource of a remote network of a first tenant, a first tenant identifier for the network connection of the first tenant, additional data from a network connection to a remote resource of a remote network of a second tenant, and a second tenant identifier for the network connection of the second tenant, wherein the network connection to the remote resource of the remote network of the first tenant and the network connection to the remote resource of the remote network of the second tenant comprise a shared virtual private network tunnel over a public Internet connection, wherein the virtual private network tunnel is coupled to remote networks of at least two tenants of at least two virtual networks;

based on the first tenant identifier for the network connection of the first tenant, setting, by the one or more processors, an identifier of the first tenant in metadata associated with the data;

based on the second tenant identifier for the network connection of the second tenant, setting, by the one or more processors, an identifier of the second tenant in metadata associated with the additional data;

obtaining, by the one or more processors, the data and the identifier in the metadata associated with the data and matching the tenant identifier to the first tenant of the shared computing environment;

based on identifying the first tenant of the shared computing environment, inserting, by the one or more processors, the data into an access virtual network of the first tenant of the shared computing environment, wherein the access virtual network of the first tenant of the shared computing environment is associated with one virtual network of the at least two virtual networks in the shared computing environment, and wherein the at least two virtual networks overlay a physical network, and wherein each virtual network of the at least two virtual networks is a virtual network of a tenant;

obtaining, by the one or more processors, the additional data and the identifier in the metadata associated with the additional data and matching the tenant identifier to the second tenant of the shared computing environment; and based on identifying the second tenant of the shared computing environment, inserting, by the one or more processors, the data into an access virtual network of the second tenant of the shared computing environment, wherein the access virtual network of the second tenant of the shared computing environment is associated with another virtual network of the at least two virtual networks in the shared computing environment.

* * * * *